United States Patent

Kubota et al.

(10) Patent No.: US 8,537,684 B2
(45) Date of Patent: Sep. 17, 2013

(54) METHODS, APPARATUS AND WIRELESS DEVICE FOR TRANSMITTING AND RECEIVING DATA BLOCKS

(75) Inventors: Keiichi Kubota, Weybridge (GB); Colin Melhuish, Wokingham (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/471,840

(22) Filed: May 15, 2012

(65) Prior Publication Data

US 2013/0039269 A1   Feb. 14, 2013

Related U.S. Application Data

(63) Continuation of application No. 13/205,216, filed on Aug. 8, 2011.

(30) Foreign Application Priority Data

Aug. 8, 2011 (GB) .................................... 1113664.5

(51) Int. Cl.
*H04J 1/16* (2006.01)

(52) U.S. Cl.
USPC .......................................... 370/235; 370/236

(58) Field of Classification Search
USPC .................. 370/230, 235, 236, 328
See application file for complete search history.

(56) References Cited

U.S. PATENT DOCUMENTS

| | | | |
|---|---|---|---|
| 7,920,477 B2 | 4/2011 | Agarwal et al. | |
| 8,165,596 B2 | 4/2012 | Chun et al. | |
| 2003/0147396 A1 | 8/2003 | Jiang | 370/394 |
| 2006/0282739 A1 | 12/2006 | Meyer et al. | |
| 2007/0064705 A1* | 3/2007 | Tateno et al. | 370/394 |
| 2007/0091810 A1* | 4/2007 | Kim et al. | 370/236 |
| 2007/0280193 A1* | 12/2007 | Kim et al. | 370/349 |
| 2008/0025319 A1* | 1/2008 | Veerapuneni et al. | 370/395.52 |
| 2008/0043619 A1* | 2/2008 | Sammour et al. | 370/231 |
| 2008/0170522 A1* | 7/2008 | Sammour et al. | 370/310 |
| 2008/0198869 A1 | 8/2008 | Jiang et al. | |
| 2008/0212605 A1 | 9/2008 | Jiang et al. | |
| 2008/0285584 A1 | 11/2008 | Guo et al. | |
| 2009/0086704 A1 | 4/2009 | Ho | 370/346 |
| 2009/0249158 A1* | 10/2009 | Noh et al. | 714/750 |
| 2009/0310534 A1 | 12/2009 | Lindskog et al. | |
| 2010/0235458 A1 | 9/2010 | Quinn et al. | |
| 2010/0322155 A1 | 12/2010 | Meyer et al. | |

(Continued)

OTHER PUBLICATIONS

3GPP TS 25.322. V10.1.0 (Jun. 2011), "$3^{rd}$ Generation Partnership Project; Technical Specification Group Radio Access Network; Radio Link Control (RLC) Protocol Specification (Release 10)", 88 pgs.

*Primary Examiner* — Andrew Lee
(74) *Attorney, Agent, or Firm* — Stanton IP Law (57) ABSTRACT

A wireless transmitter transmits a plurality of data blocks defined in a transmission window for receipt by a receiver. The transmitter transmits a status request to the receiver for positive acknowledgement of successful receipt of the status request, the status request identifying a data block. The transmitter updates the transmission window upon receipt of a positive acknowledgement of receipt of a data block or upon receipt of a positive acknowledgement of receipt of a status request relating to a data block. The updating removes the record of the data block from the transmission window and adds a record of at least one different data block to the transmission window.

27 Claims, 2 Drawing Sheets

(56) References Cited

U.S. PATENT DOCUMENTS

| | | |
|---|---|---|
| 2010/0325502 A1 | 12/2010 | Lindskog et al. |
| 2011/0032877 A1* | 2/2011 | Pani et al. .................... 370/328 |
| 2011/0041024 A1* | 2/2011 | Burbidge et al. ............. 714/749 |
| 2011/0143801 A1* | 6/2011 | Bucknell et al. .............. 455/514 |
| 2011/0268088 A1 | 11/2011 | Lindskog et al. |
| 2012/0093022 A1* | 4/2012 | Wang ............................ 370/252 |
| 2012/0102216 A1* | 4/2012 | Cui ............................... 709/232 |
| 2012/0293308 A1* | 11/2012 | Steeves ........................ 340/10.3 |

* cited by examiner

METHODS, APPARATUS AND WIRELESS DEVICE FOR TRANSMITTING AND RECEIVING DATA BLOCKS

CROSS REFERENCE TO RELATED APPLICATIONS

This patent application is a continuation application under 35 USC §120 and 37 CFR 1.53(b) of co-pending U.S. patent application Ser. No. 13/205,216 (filed Aug. 8, 2011), and also claims priority under 35 U.S.C. 119(a) and 37 CFR 1.55 from UK Patent Application Serial No. GB1113664.5 (filed Aug. 8, 2011).

TECHNICAL FIELD

The present invention relates to methods, apparatus and a wireless device for transmitting and receiving data blocks.

BACKGROUND

In communications between two devices, flow control is used to manage the pacing of data transmission between the devices to prevent a fast transmitter from outrunning a slow receiver by sending too much data too quickly. It provides a mechanism for the receiver to control the transmission speed, so that the receiver is not overwhelmed with data from transmitter. Flow control mechanisms can in general be categorised according to whether or not the receiver sends feedback to the transmitter. Various types of flow control mechanisms provide for error detection and correction. For example, for reliable communication in which it is desired to ensure that all necessary packets of data are correctly received at the receiver, an acknowledgement of one type or another may be sent by the receiver to the transmitter. For example, with positive acknowledgement (often termed ACK in some applications), the receiver explicitly notifies the transmitter which packets, messages, or segments were received correctly. With negative acknowledgment (often termed NACK in some applications), the receiver explicitly notifies the transmitter which packets, messages, or segments were not received or were received incorrectly and thus may need to be retransmitted. Variations of these basic techniques are known and used in various transmission protocols. On the other hand, in unacknowledged mode (often termed UM in some applications), there is no feedback from the receiver to the transmitter of which data packets, etc. have or have not been received.

As particular examples, Technical Specification TS 25.322 of the 3GPP (Third Generation Partnership Project) provides a specification for Acknowledge Mode Radio Link Control (AM RLC) and Unacknowledge Mode Radio Link Control (UM RLC) in wireless devices. In general, the term "wireless devices" used in this specification includes in general any device capable of connecting wirelessly to a network, and includes in particular mobile devices including mobile or cell phones (including so-called "smart phones"), data cards, USB dongles, personal digital assistants, pagers, tablet and laptop computers, content-consumption or generation devices (for music and/or video for example), etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

AM (Acknowledge Mode) RLC has the following functionality:

1. AM RLC consists of a transmitter RLC entity and a receiver RLC entity.
2. The transmitter RLC entity of one device (e.g. a network "base station", Node B, etc.) transmits RLC PDUs (protocol data units) to the other device (in this example, a user equipment or "UE") and the receiver RLC entity of the other device receives RLC PDUs.
3. If ciphering is configured, then the transmitter RLC entity ciphers the transmission RLC PDUs and the receiver RLC entity deciphers the received RLC PDUs.
4. The receiver RLC entity positively acknowledges or negatively acknowledges the receipt of RLC PDUs by sending a corresponding ACK or NACK status RLC PDU to the transmitter RLC entity.
5. The transmitter RLC entity updates a transmission window upon receipt of positive-acknowledgement ACK for the RLC PDUs that have been received by the receiver RLC entity. On the other hand, the transmitter RLC entity retransmits the negative-acknowledged RLC PDUs reported by the NACK status RLC PDUs.

A so-called service data unit (SDU) is typically segmented to form a group of RLC PDUs, which in this context are packets of data to be individually transmitted. Here, they are also referred to as AMD PDUs (Acknowledged Mode Data PDUs). The transmitter keeps a note of the group of RLC PDUs that need to be transmitted and acknowledged in the form of a transmission window, which allows control of the number of RLC PDUs being sent by the transmitter to the receiver to avoid causing a receiving buffer at the receiver to overflow. If the transmitter receives a positive acknowledgement of receipt of a particular RLC PDU from the receiver, the transmitter can update the transmission window by removing the record of that RLC PDU and adding a record of a new RLC PDU to be transmitted. From the sequentially numbered field (the SN) of the headers of the RLC PDUs, the receiver can know if particular RLC PDUs should have been received but are missing and report back accordingly to the transmitter entity, which can then retransmit the missing RLC PDUs. To support these autonomous retransmissions, a transmitter using AM RLC needs to buffer the transmitted RLC PDUs until they are positively acknowledged by the receiver RLC so that it can retransmit them if necessary, and therefore requires some data buffer in the form of hardware memory for storing the RLC PDUs of the current transmission window. Similarly, the receiver needs a buffer to store successfully received RLC PDUs for later concatenation with any retransmitted RLC PDUs. In general, AM RLC is used for data communication that requires reliability (e.g. signalling connection, FTP (File Transfer Protocol), HTTP (Hyper Text Transfer Protocol), etc.).

UM (Unacknowledge Mode) RLC has the following functionality:

1. UM RLC consists of a transmitter RLC entity and a receiver RLC entity.
2. The transmitter RLC entity transmits RLC PDUs and the receiver RLC entity receives RLC PDUs.
3. If ciphering is configured, then the transmitter RLC entity ciphers the transmission RLC PDUs and the receiver RLC entity deciphers the received RLC PDUs.
4. Ack/Nack information is not exchanged between the receiver and transmitter RLC entities. Accordingly, the transmitter RLC entity sends RLC PDUs whenever the data and the data transfer resource are available.

Notably, UM RLC does not require the transmitter or the receiver to have a buffer for storing data packets that are being transmitted as there is no retransmission of data packets (i.e. RLC PDUs in this example) that have not been received by the receiver. However, UM RLC has a serious problem that in that ciphering de-synchronisation may occur. In particular, when the transmitter ciphers the individual PDUs and transmits them, it keeps track of this by use of an incremental HFN (Hyper Frame Number), and the receiver operates similarly on receipt of the ciphered PDUs. However, if PDUs are not received by the receiver, the count maintained by the receiver gets out of step with the count used by the transmitter as they are operating independently and correct deciphering becomes impossible. UM RLC is used for real-time services, such as video and/or audio streaming services or CS voice service (for a CSoHSPA (Circuit Switched Call over a High Speed Packet Access Network) case).

Thus, conventional acknowledged mode has a problem in that it requires a relatively large hardware memory buffer at the transmitter and the receiver for storing data packets that are to be transmitted, whereas conventional unacknowledged mode has a problem in that it does not guarantee delivery of data and also leads to disrupted decryption of encrypted data if data packets are not safely received at the receiver. Both of these different problems variously inhibit developments in wireless technology.

SUMMARY

According to a first aspect of the present invention, there is provided a method of transmitting data from a transmitter to a receiver, the method comprising: a transmitter transmitting a plurality of protocol data units (PDUs), defined in a transmission window maintained by the transmitter, for receipt by a receiver; the transmitter transmitting a status request to a said receiver for positive acknowledgement of successful receipt of the status request, the status request identifying a PDU; and the transmitter updating the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver.

In the preferred embodiments, there is no retransmission of PDUs that are not successfully received in this mode of operation. This in turn means that, in this mode of operation, a data buffer is not needed in the transmitting device to store the PDUs. Also, in this mode of operation, no data buffer is required in the receiver for storing PDUs that have already been received as there will be no later concatenation with retransmitted RLC PDUs as takes place in the conventional AM mode. This means that the transmission window size can be freely increased without concern for buffer size, particularly in the receiver. This has particular advantages for multi-cell/carrier aggregation transmission as discussed further below. Moreover, in the preferred embodiments, the ciphering de-synchronisation problem discussed above does not occur because the transmission window is used for flow control. This enables real-time services to be well supported without any security problems.

The status request does not convey any user data, and thus further helps to avoid any need to buffer the data blocks. In an embodiment, the status request is a status PDU having a POLL SUFI constituting the request for positive acknowledgement.

In an embodiment, the status request is transmitted if positive acknowledgement of successful receipt of the PDU identified in the status request has not been received within a predetermined time period from transmission of the PDU. The predetermined time period may be a parameter that is configurable by a network control apparatus, which is the overall apparatus that provides for general management and control of the network and connected devices. Alternatively, or in addition, other triggers may apply for causing the status request to be transmitted.

In an embodiment, the PDUs are AMD PDUs.

In an embodiment, the transmissions form part of a multi-cell/carrier aggregation transmission. The ability to avoid the need for a buffer particularly in the receiver for storing the data blocks that are being transmitted facilitates high data throughput in multi-cell/carrier aggregation transmissions, as discussed further below.

According to a second aspect of the present invention, there is provided a method of receiving PDUs transmitted by a transmitter to a receiver, the method comprising: a receiver receiving a plurality of transmitted PDUs; the receiver receiving from a transmitter a status request for positive acknowledgement of successful receipt of the status request, the status request identifying a particular PDU; the receiver sending a positive acknowledgement of successful receipt of a PDU upon receipt of said PDU; and the receiver sending a positive acknowledgement of successful receipt of a status request relating to a particular PDU upon receipt of said status request; the receiver in this mode not buffering received PDUs.

As above, in this mode of operation, no data buffer is required in the receiver for storing PDUs that have already been received as there will be no later concatenation with retransmitted RLC PDUs as takes place in the conventional AM mode. This means that the transmission window size can be freely increased without concern for buffer size, particularly in the receiver. This has particular advantages for multi-cell/carrier aggregation transmission as discussed further below. Moreover, in the preferred embodiments, the ciphering de-synchronisation problem discussed above does not occur because the transmission window is used for flow control. This enables real-time services to be well supported without any security problems.

In an embodiment, the status request is a status PDU having a POLL SUFI constituting the request for positive acknowledgement.

In an embodiment, the positive acknowledgement identifies the corresponding PDU by reference to a sequence number of the PDU.

In an embodiment, the PDUs are AMD PDUs.

In an embodiment, the transmissions to the receiver form part of a multi-cell/carrier aggregation transmission.

In an embodiment, the receiver monitors for dropped PDUs which are not successfully received and initiates a switch to a different mode of transmission if the number of dropped PDUs occurring in a predetermined time period exceeds a predetermined number. This provides for an easy switch to a more reliable operation mode if and when required, such as the conventional AM RLC mode discussed above. The predetermined time period and the predetermined number may each be a parameter that is configurable by a network control apparatus, which again is the overall apparatus that provides for general management and control of the network and connected devices.

In an embodiment, the receiver considers PDUs that were not successfully received before the switch to the different mode of transmission as lost PDUs and updates state variables maintained by the receiver accordingly. Preferably, the corresponding state variables on the transmitter side are also updated accordingly.

There is also provided a computer program comprising code such that when the computer program is executed on a computing device, the computing device is arranged to cause a wireless device to carry out a method as described above in either aspect.

According to a third aspect of the present invention, there is provided a processing system for a transmitter that transmits data to a receiver, the processing system being constructed and arranged to cause: transmission of a plurality of PDUs, defined in a transmission window maintained by the transmitter, for receipt by a receiver; transmission of a status request to a said receiver for positive acknowledgement of successful receipt of the status request, the status request identifying a PDU; and updating of the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver.

According to a fourth aspect of the present invention, there is provided a processing system for a receiver that receives PDUs transmitted by a transmitter, the processing system being constructed and arranged to cause: a said receiver to be able to receive a plurality of transmitted PDUs; a said receiver to be able to receive a status request for positive acknowledgement of successful receipt of the status request, the status request identifying a particular PDU; a said receiver to send a positive acknowledgement of successful receipt of a PDU upon receipt of said PDU; and a said receiver to send a positive acknowledgement of successful receipt of a status request relating to a particular PDU upon receipt of said status request; the receiver in this mode not buffering received PDUs.

There is also provided a wireless device having a processing system as described above in either aspect.

The processing system may comprise at least one processor and at least one memory including computer program code, the at least one memory and the computer program code being configured, with the at least one processor, to cause the wireless device at least to perform a method as described above.

According to a fifth aspect of the present invention, there is provided a wireless device that is capable of wirelessly transmitting signals to and receiving signals from another wireless device, the device being constructed and arranged such that: when transmitting, the device: transmits a plurality of PDUs, defined in a transmission window maintained by the transmitter, for receipt by a said other wireless device; transmits a status request to a said other wireless device for positive acknowledgement of successful receipt of the status request, the status request identifying a PDU; and updates the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver; and, when receiving, the device: receives a plurality of transmitted PDUs from a said other wireless device; receives from a said other wireless device a status request for positive acknowledgement of successful receipt of the status request, the status request identifying a particular PDU; sends a positive acknowledgement of successful receipt of a PDU upon receipt of said PDU; and sends a positive acknowledgement of successful receipt of a status request relating to a particular PDU upon receipt of said status request; the receiver in this mode not buffering received PDUs.

Further features and advantages of the invention will become apparent from the following description of preferred embodiments of the invention, given by way of example only, which is made with reference to the accompanying drawings.

DETAILED DESCRIPTION

Figure 1:
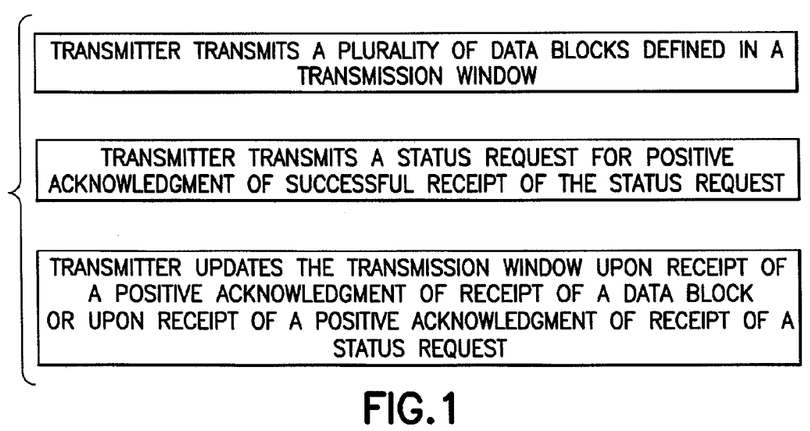
FIG. 1 shows schematically an example of a transmission method according to a embodiment of the present invention.
Figure 2:
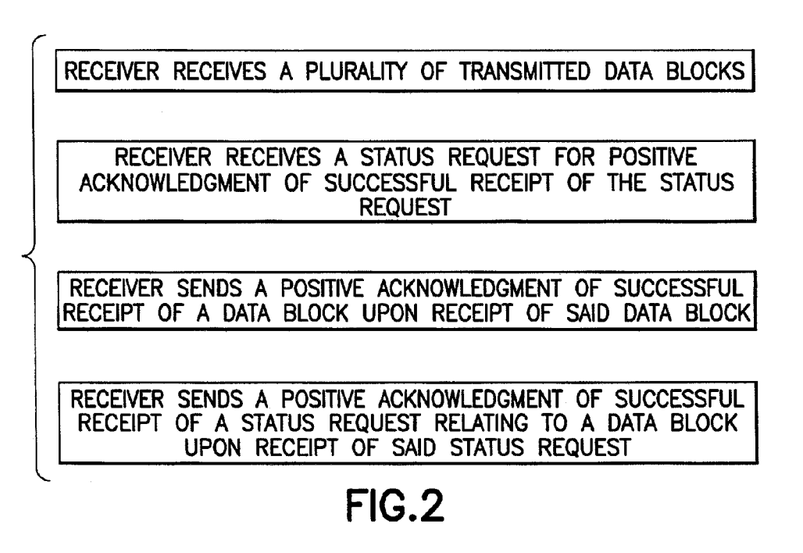
FIG. 2 shows schematically an example of a reception method according to a embodiment of the present invention.

In broad terms, and referring to the schematic drawings of FIGS. 1 and 2, an example of a combination of a transmitter and a receiver cooperating in accordance with an embodiment of the present invention has the following functionality:

1. There is a transmitter RLC entity and a receiver RLC entity.

2. The transmitter RLC entity transmits RLC PDUs and the receiver RLC entity receives RLC PDUs.

3. The receiver RLC entity sends a positive acknowledgement in a status RLC PDU to the transmitter RLC entity upon successful receipt of a RLC PDU or in response to receipt of a separate poll status request relating to a RLC PDU from the transmitter RLC entity, but does not provide any negative acknowledgement to the transmitter RLC entity of any RLC PDU not received.

4. The transmitter RLC entity updates the transmission window upon receipt of the positive acknowledgement.

The updating of the transmission window (only) upon receipt of the positive acknowledgement avoids the ciphering sequence number mismatch discussed above as the transmitter and receiver remain synchronised. Also, because there is no retransmission of RLC PDUs when operating in this mode, the receiver does not require a buffer (in particular, a hardware memory) for storing RLC PDUs that have already been received as there will be no later concatenation with retransmitted RLC PDUs as takes place in the conventional AM mode. This is of particular benefit when considering downlink data being sent to a receiver that is user equipment (or "UE"), such as a mobile phone or the like, as it helps to keep down the cost and complexity of the receiver equipment and also facilitates multi-cell or "carrier aggregation" operation. Also, because there is no retransmission of RLC PDUs when operating in this mode, the transmitter device (whether say a network control apparatus or a UE) does not require a buffer (in particular, a hardware memory) for storing RLC PDUs that have been transmitted, such a buffer being used in conventional acknowledged mode transmission because RLC PDUs that were not successfully received are retransmitted by the transmitter.

This method of operation may be referred to as a "retransmission-less AM RLC" mode. In a sense, this can be regarded as something like an enhanced UM RLC operation: the retransmission-less AM RLC is UM RLC+positive acknowledge reporting for transmission window update.

A disadvantage of this mode of operation compared to say the conventional AM mode is that reliability of transmission is not guaranteed. However, other mechanisms to achieve reliability can be employed, particularly in certain applications. As examples, the TCP/IP (transmission control protocol/internet protocol) layer and MAC-hs/MAC-ehs (i.e. the High Speed Medium Access protocol HSDPA HARQ (Hybrid Automatic Repeat Request in High-Speed Downlink Packet Access of enhanced 3GPP)) both guarantee reliable data communication. Moreover, a switch to a conventional mode of operation, such as conventional AM operation, can be made if it is decided for example that radio conditions are particularly poor, as discussed further below.

As mentioned, the removal of the need for storing of the transmitted RLC PDUs in a (hardware memory) buffer by the receiver is of benefit not only potentially to keep down hardware costs for wireless devices, but also in allowing an improved implementation of multi-cell or "carrier aggregation" operation, which has been proposed in order particularly to provide increased bandwidth for wireless devices. In simple terms, in carrier aggregation, a wireless device connects wirelessly using two or more network carriers to increase the peak data rates available and to make better use of the available resources by multiplexing the carriers. In general, the carriers may be in different but overlapping cells, may use the same or different frequencies, and may or may not use MIMO (multiple-input and multiple-output, i.e. the use of multiple antennas at both the transmitter and receiver to improve communication performance). As a particular example, recent proposals in 3GPP, provide for the use of eight network cells for this purpose (termed 8C-HSDPA or 8-Cell High Speed Downlink Packet Access), which in theory could provide a maximum physical layer throughput or bandwidth of 336 Mbps.

In general, one way of calculating the maximum bandwidth or, in the particular case of 3GPP, the RLC (Radio Link Control) throughput, is via the following formula:

Maximum RLC throughput=RLC PDU size×RLC window size/RTT where, as above, PDU is a protocol data unit (effectively the packet of data being sent across the wireless network), and RTT is the round trip time. As above, the RLC window is a concept used for flow control in certain scenarios and defines a particular set of RLC PDUs that the transmitter is attempting to transmit to a receiver at any particular time.

In practice, 3GPP assumes a practical RTT of about 70 ms, a current maximum RLC window size of 2047 (i.e. the transmitter is currently attempting to transmit 2047 PDUs), and a practical RLC PDU size of say 4000 bits. With these values, the maximum RLC throughput calculated as above would be 111.52 Mbps, which is much less than the theoretical maximum physical layer throughput for 8C-HSDPA mentioned above.

Accordingly, there have been some proposals to increase the RLC window size from 2047 to 8188 so that the RLC can handle or achieve the maximum theoretical 8C-HSDPA throughput. However, a significant problem with increasing the RLC window size is that, with current modes of operation, it increases the cost of the wireless device because it requires the device to have a larger capacity memory buffer for storing the RLC PDUs in the transmission window when transmitting and in the receiving window when receiving. So, in this example, if the transmission/receiving window is increased to 8188 and thus the buffer in the wireless device has to store up to 8188 PDUs of 4000 bits each, the capacity of the buffer has to increase from about 1 Mbyte (2047×4000 bits) to about 4 Mbytes (8188×4000 bits). In practical terms, this represents a relatively large increase in hardware requirements and therefore cost for the wireless device.

The preferred embodiments avoid this problem because there is no need for a buffer to store the received RLC PDUs, because there is no retransmission of PDUs that have not been received so the wireless device does not need to buffer the partially received RLC PDUs for concatenation with the retransmitted RLC PDUs as takes place with the conventional AM mode. Moreover, there is no need for a buffer to store RLC PDUs that have been transmitted when in transmitting mode. Accordingly, when using the present embodiments, the window size can be freely increased without requiring any corresponding increase in the hardware memory size required in the receiver.

The retransmission-less mode of operation of the present embodiments is particularly suitable when the radio condition is good and transmitted RLC PDUs are normally safely received by the receiver. However, if the radio conditions are poor, for example because of weak signals, obstructions, etc., it may be desirable or necessary to revert to a different mode of operation, such as the conventional AM operation.

As an example, in broad terms, this can be achieved as follows.

The network control apparatus provides the configuration parameters for the conventional operation as well as the configuration parameters for the present retransmission-less operation in advance so that the wireless device and the network control apparatus can switch the mode dynamically. In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, UMTS LTE makes use of a so-called Evolved Node B (eNB) where the RF transceiver and resource management/control functions are combined into a single entity.

For the present retransmission-less operation, the network control apparatus signals the following parameters, using for example a RRC protocol:
  (i) RLC receiving window size for the retransmission-less operation
  (ii) Number N of dropped PDUs+time duration t for counting the dropped PDUs by the receiver
  (iii) parameters for a conventional UM RLC (optional)

As an example, a switch from the present retransmission-less to a conventional mode of operation is triggered by the wireless device counting the number of dropped RLC PDUs within the particular time duration given by the network control apparatus. If the wireless device detects a dropped RLC PDU N times within the time duration t while the wireless device is in the retransmission-less mode, then the wireless device indicates the data drop to the network control apparatus and then the network control apparatus and the wireless device both switch mode to the conventional operation.

As an example for switching from a conventional mode of operation to the present retransmission-less operation mode, the switch can triggered by the network control apparatus according to the U-plane activities of the wireless device. The U-plane or user plane relates to user-generated activities, such as user-generated data (in contrast with the control plane or C-plane, which relates to control data). So, for example, the network control apparatus may determine to switch back to the present retransmission-less operation according to the U-plane activities such as if the wireless device does not report any NACK messages for a certain time duration (which suggests that radio reception is good for example). When the network control apparatus decides to switch the mode to the present retransmission-less operation, the network control apparatus signals the wireless device about the mode change and the wireless device and the network control apparatus both switch the mode accordingly.

Particular examples of specific implementations of the embodiments discussed above will now be described. Reference will be made to various publicly available 3GPP Technical Specifications, referred to below with the designation TS 25.322 and TS 25.331, and particular clauses and subclauses of those Technical Specifications. It will be understood that these 3GPP Technical Specifications are amended and updated from time to time and that these specific examples will be adapted accordingly. The entire contents of TS 25.322 and TS 25.331 in particular are incorporated herein by reference.

The transmitter RLC entity of this specific example has the following functionality:

1. It transmits RLC PDUs according to TS 25.322 subclause 11.3.2 apart from the LI (Length Indicator) setting, LI being set according to the UM LI setting rules specified in TS 25.322 subclause 9.2.2.8.

2. It indicates a poll bit in the RLC PDU, or sends a separate status PDU with a POLL SUFI (Super Field), to force the receiver RLC entity to acknowledge the receipt of the corresponding RLC SN (Sequence Number). The polling is controlled by the configuration parameters given by IE (Information Element) "Polling info" (ref. TS 25.331 subclause 10.3.4.4). POLL SUFI is discussed in detail in TS 25.322 subclauses 9.2.2.11.9 and 11.3.5. The trigger for sending a separate status PDU with a POLL SUFI (Super Field) may be a timer set for non-receipt of a positive acknowledgement and/or in accordance with any of the triggers discussed in 3GPP TS 25.322 subclause 9.7.1.

3. It maintains AM transmitter's state variables specified in TS 25.322 subclause 9.4, though the state variable VT(DAT) may or may not be used depending on the particular implementation. The VT(DAT) state variable counts the number of times a RLC PDU or, more pertinently here, a status PDU containing the POLL SUFI for that RLC PDU has been scheduled to be transmitted. The use of VT(DAT) here can help avoid a deadlock occurring if the transmitter were to attempt repeatedly to transmit status PDUs for a particular RLC PDU. The transmitter updates the transmission window by appropriately updating the VT(A) state variable.

The receiver RLC entity of this specific example has the following functionality:

1. It receives RLC PDUs according to TS 25.322 subclause 11.3.3 apart from LI decoding rules, the LIs being decoded according to TS 25.322 subclause 11.2.3.1.

2. If it receives a poll bit via an AM data PDU or separate status PDU, it sends a positive acknowledgement for the RLC SN, which is equal to VR(H)−1 (VR(H) being defined in TS 25.322 subclause 9.4) by sending a status PDU with ACK SUFI. The status PDU transmission is controlled by the configuration parameters given by IE "Downlink RLC status info" (ref. TS 25.331 subclause 10.3.4.1)

3. It maintains AM receiver's state variables specified in TS 25.322 subclause 9.4.

These functionalities for the transmitter and receiver RLC entities in wireless devices in the context of 3GPP cause the devices to operate as outlined above. There is no retransmission of RLC PDUs by the transmitter. The transmission window is (only) updated upon receipt of positive acknowledgement from the receiver. The transmitter sends specific requests for positive acknowledgement to the receiver as necessary, particularly when a positive acknowledgement has not been received after a defined period of time or according to some other specific trigger. This avoids the need for a buffer in the transmitter for storing the PDUs to be transmitted in this mode of operation, and also avoids the need for a buffer in the receiver to store the received RLC PDUs, and yet retains synchronisation between the transmitter and receiver required for robust deciphering purposes. Other triggers for the sending of the specific requests for positive acknowledgement (the status PDU with a POLL SUFI (Super Field) in the specific example above) include one or more of those set out in TS 25.322 subclause 9.7.1. These can be summarised as: (i) on transmission of the last PDU in the transmission buffer; (ii) on transmission of the last PDU in the retransmission buffer; (iii) expiry of a poll timer (which is started whenever a poll bit is transmitted and on expiry triggers another poll bit to be transmitted if the requested status report has not been received); (iv) every nth PDUs transmitted; (v) every nth SDUs transmitted; (vi) once the transmission window becomes n % full; and (vii) periodically based on a free-running timer.

Notably, in one embodiment, the transmitter RLC entity starts a timer when it transmits a RLC PDU to look for receipt of a positive ACK for that RLC PDU sent by the receiver RLC entity (the sending of which is triggered by the poll bit in the received RLC PDU) within a predetermined time period (which may be configured by the network control apparatus sending a configuration signal). If a positive ACK for that RLC PDU is not received within the predetermined time period, or if any of the other triggers mentioned above apply, the transmitter RLC entity transmits a status PDU with a POLL SUFI that includes the sequence number of the RLC PDU concerned. Receipt of the status PDU prompts the receiver RLC entity to send a positive ACK to the transmitter RLC entity for the identified RLC PDU regardless of whether that RLC PDU has in fact been received. On receipt of the positive ACK (whether sent by the receiver in response to receipt of the original RLC PDU or in response to receipt of a status PDU requesting acknowledgement), the transmitter RLC entity can then update the transmission window to remove the record of that RLC T and to add a record of a new RLC PDU to be transmitted. It should be noted here that the receiver RLC entity does not send a negative NACK to the transmitter RLC entity if the relevant RLC PDU has not been received, as happens with conventional systems to cause retransmission of the missing RLC PDU. It should also be noted that the Poll status PDU does not convey any user data. Accordingly, the transmitter does not need to buffer the whole RLC PDU for retransmission but just needs to remember the last transmitted RLC SN (which it remembers anyway in order to maintain the transmission window) and, importantly, the receiver does not need to buffer any received RLC PDUs (because it does not need to store them for later use as there is no retransmission of non-received RLC PDUs).

As a specific example for switching from the present retransmission-less mode to a conventional operation mode (for example, when radio conditions for downlink transmission of data over a network to a wireless device are poor) in the context of 3GPP, the following takes place:

1. The receiving RLC entity of a wireless device starts a timer for monitoring dropped PDUs upon detection of an RLC PDU drop (assuming the timer has been configured by the network control apparatus). The fact that an RLC PDU has been lost and not received can be determined by the receiving RLC entity inspecting the sequence numbers of the RLC PDUs that have been received and noting that one or more of the sequence is missing, or because the receiving RLC entity has received a status PDU with a POLL SUFI for an RLC PDU as discussed above, which indicates that the RLC PDU was dropped, or a combination of these two methods.

2. If the receiving RLC entity of the wireless device detects dropped RLC PDUs N times within the time period t set by the network control apparatus, then the transmitter RLC entity of that wireless device sends a status PDU with a new SUFI "SWITCH" including a target mode set to "Normal".

3. When the network control apparatus receives the SWITCH status PDU with the new SUFI "SWITCH", the transmitter RLC entity of the network control apparatus sends a status PDU with a new SUFI "SWITCH_ACK" including a target mode set to "Normal" and also a SN_ACT field, which indicates the SN (sequence number) at which the transmitter RLC entity of the network control apparatus will be starting the conventional AM operation (such as specified in TS 25.322). The transmitter RLC entity of the network control apparatus starts the conventional AM operation when the transmission RLC PDU's SN reaches the SN_ACT_value signalled in the sent status PDU.

4. When the receiver RLC entity of the wireless device receives the SWITCH_ACK status PDU with the same target mode (i.e. "Normal"), the receiver RLC entity of the wireless device starts the conventional AM operation upon receipt of the AM data PDU that has a SN that is equal to the SN_ACT value given by the SWITCH_ACK status PDU. The wireless device completes the mode switch procedure.

If the wireless device does not receive the SWITCH_ACK status PDU after the SWITCH status PDU transmission, the wireless device continues the present retransmission-less operation, but also continues monitoring dropped RLC PDUs. The wireless device may therefore send another SWITCH status PDU if the SWITCH status PDU transmission criteria are met.

The receiver RLC entities in the wireless device and the network control apparatus shall consider the RLC PDUs that were not received before the SN_ACT as lost RLC PDUs, and update the corresponding state variables and discard the RLC SDUs that correspond to the dropped RLC PDUs.

Two specific examples for switching from a conventional operation mode in the context of 3GPP to the present retransmission-less mode (for example, when radio conditions for downlink transmission of data over a network to a wireless device are determined to be good) will now be described, the first using RLC (Radio Link Control) signalling and the other using RRC (Radio Resource Control) signalling.

In the case of the example using RLC signalling, the following takes place:

1. When the network control apparatus decides to activate the present retransmission-less operation, the network control apparatus sends a status PDU with a new SUFI "SWITCH" including a target mode set to "Retransmission-less" and SN_ACT field, which indicates the SN where the network control apparatus transmitter RLC entity will start the retransmission-less operation. The network control apparatus transmitter RLC entity starts the retransmission-less operation upon transmission of an AM data PDU including the SN equal to the SN_ACT value signalled in the SWITCH status PDU.

2. When the wireless device receives the SWITCH status PDU with the new SUFI "SWITCH", the wireless device receiver RLC entity switches the mode to the retransmission-less operation at the receipt of an AM data PDU including the SN equal to the SN_ACT value indicated in the SWITCH status PDU. The wireless device transmitter RLC entity sends back a status PDU with a new SUFI "SWITCH_ACK" including a target mode set to "Retransmission-less".

3. The network control apparatus completes the switch procedure upon receipt of the SWITCH_ACK status PDU with the same target mode (i.e. "Retransmission-less").

If the network control apparatus does not receive the SWITCH_ACK status PDU with the same target mode (i.e. "Retransmission-less") after the SWITCH status PDU transmission or if the network control apparatus receives a negative acknowledgement for a RLC SN that is past the SN_ACT value, the network control apparatus may send another SWITCH status PDU until the network control apparatus receives the SWITCH_ACK status PDU.

The receiver RLC entity in the wireless device considers the RLC PDUs not received before the SN_ACT as lost RLC PDUs and updates the corresponding state variables and discards the RLC SDUs that correspond to the dropped RLC PDUs.

In the case of the example using RRC signalling, the following takes place:

1. When the network control apparatus decides to activates the retransmission-less operation, the network control apparatus sends an RRC message, which configures the retransmission-less operation mode (e.g. via an RRC reconfiguration message (RadioBearerSetup, RadioBearerReconfiguration)).

2. The wireless device and the network control apparatus apply the retransmission-less operation mode for their respective transmitter and receiver RLC entities at the activation time given by the RRC message.

Figure 3:
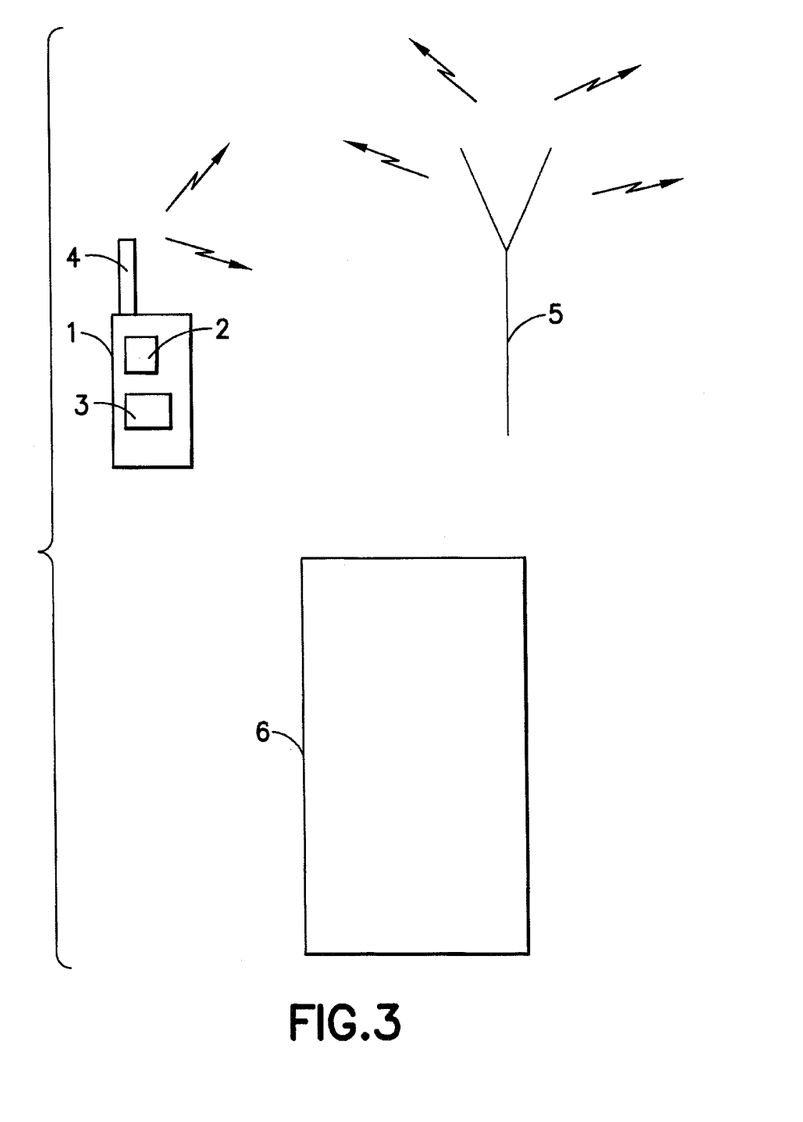
FIG. 3 shows schematically a user equipment, in this case in the form of a mobile phone/smartphone in communication with a radio mast.

FIG. 3 shows schematically a user equipment or wireless device, in this case in the form of a mobile phone/smartphone 1. The user equipment 1 contains the necessary radio module 2, processor(s) and memory/memories 3, antenna 4, etc. to enable wireless communication with the network. The user equipment 1 in use is in communication with a radio mast 5. The radio mast 5 in this case is in the form of a Node B which is in communication with a Radio Network Controller 6.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. For example, whilst described principally in the context of devices operating according to 3GPP, and specifically UMTS, the principles of the invention can be applied to other wireless standards and protocols, including for example LTE (Long Term Evolution). It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transmitting data from a transmitter, the method comprising:
   transmitting from the transmitter a plurality of protocol data units (PDUs), defined in a transmission window maintained by the transmitter, for receipt by a receiver;
   transmitting from the transmitter a status request to a said receiver for positive acknowledgement of successful receipt of the status request, the status request identifying a PDU; and
   updating the transmission window in the transmitter to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver.

2. A method according to claim 1, wherein the status request is transmitted if positive acknowledgement of successful receipt of the PDU identified in the status request has not been received within a predetermined time period from transmission of the PDU.

3. A method according to claim 1, wherein the status request is a status PDU having a POLL SUFI constituting the request for positive acknowledgement.

4. A method according to claim 1, wherein the PDUs are AMD PDUs.

5. A method according to claim 1, wherein the transmissions form pan of a multi-cell/carrier aggregation transmission.

6. A method of receiving PDUs at a receiver, the method comprising:
   receiving at the receiver a plurality of transmitted PDUs;
   receiving at the receiver from a transmitter a status request for positive acknowledgement of successful receipt of the status request, the status request identifying a particular PDU;
   the receiver sending from the receiver a positive acknowledgement of successful receipt of a PDU upon receipt of said PDU; and
   sending from the receiver a positive acknowledgement of successful receipt of a status request relating to a particular PDU upon receipt of said status request;
   the receiver in this mode not buffering received PDUs.

7. A method according to claim 6, wherein the status request is a status PDU having a POLL SUFI constituting the request for positive acknowledgement.

8. A method according to claim 6, wherein the positive acknowledgement identifies the corresponding PDU by reference to a sequence number of the PDU.

9. A method according to claim 6, wherein the PDUs are AMD PDUs.

10. A method according to claim 6, wherein the transmissions to the receiver form part of a multi-cell/carrier aggregation transmission.

11. A method according to claim 6, the method further comprising monitoring by the receiver for dropped PDUs which are not successfully received and initiating a switch to a different mode of transmission if the number of dropped PDUs occurring in a predetermined time period exceeds a predetermined number.

12. A method according to claim 11, wherein the receiver considers PDUs that were not successfully received before the switch to the different mode of transmission as lost PDUs and updates state variables maintained by the receiver accordingly.

13. A processing system for a transmitter that transmits data to a receiver, the processing system comprising at least one processor and at least one memory including computer program code and being constructed and arranged to cause:
   transmission of a plurality of PDUs, defined in a transmission window maintained by the transmitter, for receipt by a receiver;
   transmission of a status request to a said receiver for positive acknowledgement of successful receipt of the status request, the status request identifying a PDU; and
   updating of the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver.

14. A processing system according to claim 13, wherein the processing system is constructed and arranged such that the status request is transmitted if positive acknowledgement of successful receipt of the PDU identified in the status request has not been received within a predetermined time period from transmission of the PDU.

15. A processing system according to claim 13, wherein the processing system is constructed and arranged such that the status request is a status PDU having a POLL SUFI constituting the request for positive acknowledgement.

16. A processing system according to claim 13, wherein the processing system is constructed and arranged such that the PDUs are AMD PDUs.

17. A wireless device having a processing system according to claim 13.

18. A processing system for a receiver that receives PDUs transmitted by a transmitter, the processing system comprising at least one processor and at least one memory including computer program code and being constructed and arranged to cause:
- a said receiver to be able to receive a plurality of transmitted PDUs;
- a said receiver to be able to receive a status request for positive acknowledgement of successful receipt of the status request, the status request identifying a particular PDU;
- a said receiver to send a positive acknowledgement of successful receipt of a PDU upon receipt of said PDU; and
- a said receiver to send a positive acknowledgement of successful receipt of a status request relating to a particular PDU upon receipt of said status request;
- the receiver in this mode not buffering received PDUs.

19. A processing system according to claim 18, wherein the processing system is constructed and arranged such that the status request is a status PDU having a POLL SUFI constituting the request for positive acknowledgement.

20. A processing system according to claim 18, wherein the processing system is constructed and arranged such that the positive acknowledgement identifies the corresponding PDU by reference to a sequence number of the PDU.

21. A processing system according to claim 18, wherein the processing system is constructed and arranged such that the PDUs are AMD PDUs.

22. A processing system according to claim 18, wherein the processing system is constructed and arranged such that the receiver monitors for dropped PDUs which are not successfully received and initiates a switch to a different mode of transmission if the number of dropped PDUs occurring in a predetermined time period exceeds a predetermined number.

23. A processing system according to claim 22, wherein the processing system is constructed and arranged such that the receiver considers PDUs that were not successfully received before the switch to the different mode of transmission as lost PDUs and updates state variables maintained by the receiver accordingly.

24. A wireless device having a processing system according to claim 18.

25. A wireless device that is capable of wirelessly transmitting signals to and receiving signals from another wireless device, the device comprising at least one processor and at least one memory including computer program code and being constructed and arranged such that:
when transmitting, the device:
- transmits a plurality of PDUs, defined in a transmission window maintained by the transmitter, for receipt by a said other wireless device;
- transmits a status request to a said other wireless device for positive acknowledgement of successful receipt of the status request, the status request identifying a PDU; and
- updates the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver; and, when receiving, the device:
- receives a plurality of transmitted PDUs from a said other wireless device;
- receives from a said other wireless device a status request for positive acknowledgement of successful receipt of the status request, the status request identifying a particular PDU;
- sends a positive acknowledgement of successful receipt of a PDU upon receipt of said PDU; and
- sends a positive acknowledgement of successful receipt of a status request relating to a particular PDU upon receipt of said status request; the receiver in this mode not buffering received PDUs.

26. A memory tangibly storing computer program comprising code for transmitting data from a transmitter to a receiver such that when the computer program is executed on a computing device, the computing device is arranged to cause a wireless device to:
- transmit a plurality of protocol data units (PDUs), defined in a transmission window maintained by a transmitter, for receipt by a receiver;
- transmit a status request to a said receiver for positive acknowledgement of successful receipt of the status request, the status request identifying a PDU; and
- update the transmission window to remove the record of a particular PDU from the transmission window and to add a record of at least one different PDU to the transmission window upon receipt of a positive acknowledgement of receipt of that particular PDU or upon receipt of a positive acknowledgement of receipt of a status request relating to that particular PDU, the transmitter in this mode not retransmitting PDUs that are not acknowledged as received by said receiver.

27. A memory tangibly storing computer program comprising code for receiving PDUs transmitted by a transmitter to a receiver such that when the computer program is executed on a computing device, the computing device is arranged to cause a wireless device to:
- receive at a receiver a plurality of transmitted PDUs;
- receive from a transmitter a status request for positive acknowledgement of successful receipt of the status request, the status request identifying a particular PDU;
- send a positive acknowledgement of successful receipt of a PDU upon receipt of said PDU; and
- send a positive acknowledgement or successful receipt of a status request relating to a particular PDU upon receipt of said status request; where the receiver in this mode not buffering received PDUs.

* * * * *